United States Patent Office 3,045,004
Patented July 17, 1962

3,045,004
DISAZO DYES
Ermanno Gaetani, Milan, Italy, assignor to Aziende Colori Nazionali Affini ACNA S.p.A., Milan, Italy, a corporation of Italy
No Drawing. Filed Apr. 14, 1960, Ser. No. 22,118
Claims priority, application Italy Apr. 16, 1959
3 Claims. (Cl. 260—186)

An object of the present invention is to provide certain new water-insoluble disazo dyes having the general Formula A:

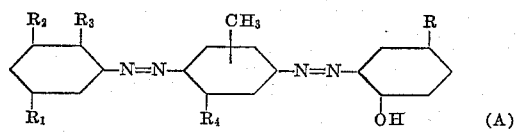

where R is an alkyl radical having up to 4 carbon atoms, $R_1$, $R_2$, $R_3$ and $R_4$ are selected from the group consisting of hydrogen and methyl radicals, $R_1$ being always different from $R_2$.

The dyes of the above mentioned general Formula A are suitable for direct dyeing of polyolefinic materials by simple application at the boiling temperature of the dyeing bath.

Among the dyes of the general Formula A, the following dyes have been shown to be particularly suitable for dyeing polypropylene and polyethylene materials:

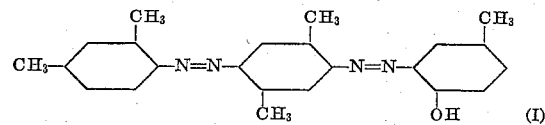

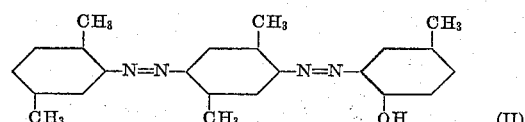

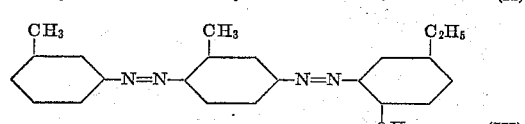

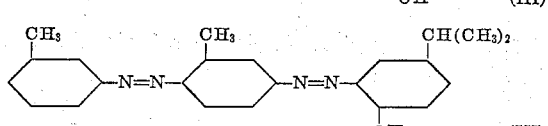

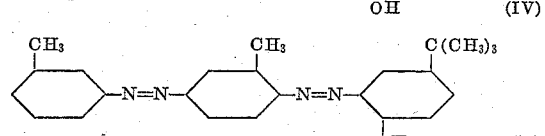

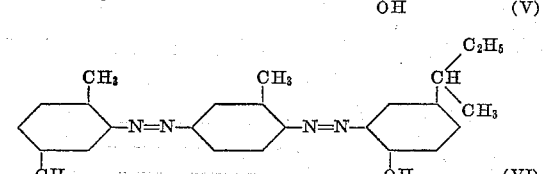

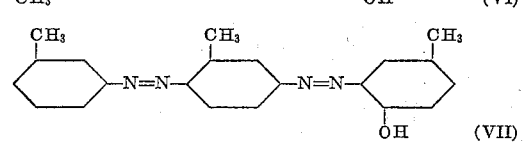

These compounds of general Formula A are obtained by coupling, in the presence of a strong base, one mol of an amino azo compound of the type:

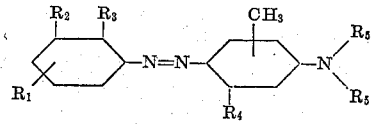

wherein $R_1$, $R_2$, $R_3$, $R_4$ have the above mentioned meaning and $R_5$ is hydrogen, with one mol of a compound of the type:

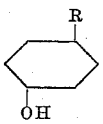

wherein R has the above mentioned meaning.

The following examples will further illustrate my invention however without limiting its scope (all parts are by weight unless otherwise indicated).

Example 1

25.3 g. 4-amino-2,5,2',4'-tetramethyl-azobenzene (prepared according to Noelting, Ber. 18, 2686), are diazotized as usual in 300 g. water and 35 g. hydrochloric acid solution (density 1.17) by addition of a solution of 7 g. sodium nitrite in 20 g. water.

The temperature is kept at about 10–15° C. by careful addition of ice. The diazo-azo-compound obtained (which is partially in suspension) is added to a solution of 12 g. 4-methyl-phenol in 200 g. water and 14 parts of a sodium hydroxide solution (density 1.3) by adding at the same time 50 g. sodium acetate. The temperature is kept at about 10° C.

When the coupling is completed, the mass is briefly heated to 60° C., the precipitated disazo compound is filtered, washed with cold water until it is neutral, dried and ground. The dye thus obtained, having a brown-yellow colour, corresponds to the formula:

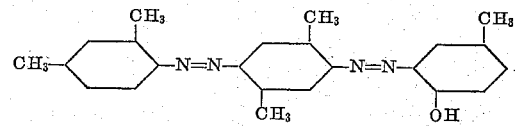

(melting point 196° C.).

By paper chromatography (eluent: organic portion of the mixture; butyl alcohol: acetic acid: water=4:1:5) the dye gives a uniform reddish yellow spot which turns to red with sodium hydroxide and remains unaltered with hydrochloric acid.

Example 2

25.3 g. amino-2.5.2'.5'-tetramethylazobenzene (prepared according to Noelting Ber. 18, 2686), are diazotised as described in Example 1 and coupled in the same way with 4-methyl phenol.

The disazo dye obtained, which after grinding consists of a brown-yellow powder, has a melting point of 205° C. and corresponds to the formula:

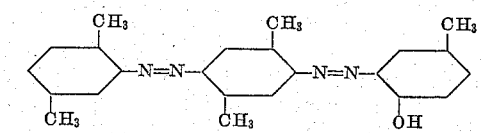

Example 3

22.5 g. 4-amino-2,3'-dimethylazobenzene are diazotised as described in Example 1; the diazo-azo compound obtained in solution is added to a solution of 13.5 g. 4-ethyl-phenol in 200 g. water and 60 g. pyridine; the temperature is kept at about 10° C.

When the coupling is completed, the solution is acidified (Congo red) with a hydrochloric acid solution and the disazo dye thus obtained is filtered, washed until it is neutral and is finally dried.

The dye obtained, consists after grinding of a brown yellow powder having a melting point of 106° C., and corresponds to the formula:

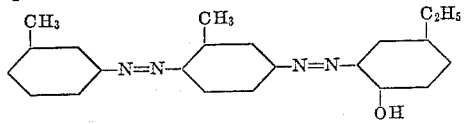

Example 4

22.5 g. 4-amino-2,3'-dimethylazobenzene are diazotised as described in Example 1, the diazo-azo compound obtained is then added to a solution consisting of 15 g. 4-isopropyl phenol, 200 g. water and 80 g. pyridine.

The temperature is kept at about 10° C. When the coupling is completed the disazo dye is isolated as described in Example 3 and then dried. After grinding the dye appears in the form of a brown-yellow powder, having the formula:

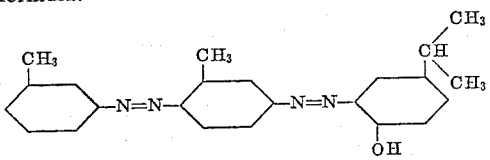

(melting point 110° C.).

Example 5

22.5 g. 4-amino-3,3'-dimethylazobenzene (obtained according to Mohner, j. pr [2], 65, 445), are diazotised as described in Example 1; the diazo-azo compound, in solution, is added to a solution consisting of 16.5 g. 4-tert. butyl phenol, 200 g. water and 80 g. pyridine. The temperature is kept at about 10° C.

When the coupling is completed, the disazo dye obtained is isolated as described in Example 3, and then dried.

After grinding the dye appears in the form of a brown-yellow powder having the formula:

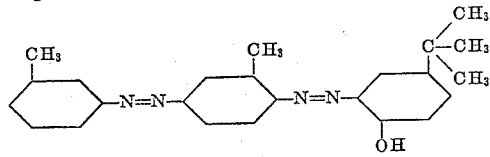

(melting point 148° C.).

Example 6

12.1 g. 2,5-dimethylaniline are diazotised as usual and then the diazo azo compound is coupled with a solution of 25 g. of the sodium salt of o-toluidine ω-methan-sulfonic acid in 250 g. water and 50 g. crystalline sodium acetate; the azo dye obtained is filtered, washed and suspended in 200 parts ethanol and 20 g. sodium hydroxide solution (36 Bé.); the obtained mixture is thus heated for 1 hour to the boiling point and the obtained suspension is cooled, diluted with water and the formed 4-amino-3,2',5'-trimethylazobenzene is filtered and recrystallized from alcohol (melting point 128° C.).

24 g. of the obtained crystallized amino-azo compound, are diazotised as described in Example 1. The diazo-azo compound, partially in suspension, is added to a solution consisting of 18 g. 4-isoamylphenol, 200 g. water and 80 g. pyridine, while keeping the temperature at about 10° C.; at the end of the coupling, the formed disazo dye is isolated as described in Example 3 and dried.

After grinding the dye appears as a brown-yellow powder having the formula:

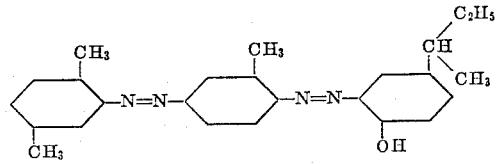

(melting point 136° C.).

Example 7

22.5 g. 4-amino-2,3'-dimethylazobenzene are diazotised as described in Example 1, and the obtained diazo-azo compound is coupled, as described in Example 1 with 4-methylphenol.

The obtained disazo dye which appears after grinding in the form of a brown-yellow powder corresponds to the formula:

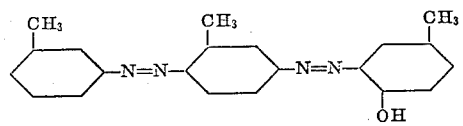

(melting point 130° C.).

Having thus described my invention, what I desire to secure and to claim by Letters Patent is:

1. A disazo dye, insoluble in water, having a formula selected from the group consisting of

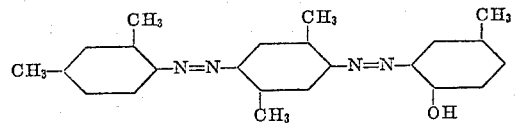

and

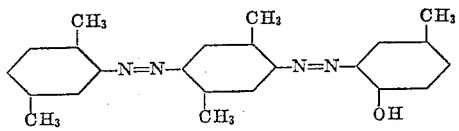

2. A disazo dye, insoluble in water, having the following formula

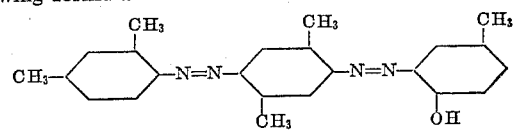

3. A disazo dye, insoluble in water, having the following formula

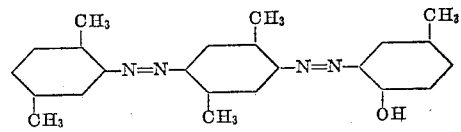

References Cited in the file of this patent

UNITED STATES PATENTS 2,120,743    Graenacher et al.    June 14, 1938

FOREIGN PATENTS 190,720    Switzerland    July 16, 1937
200,533    Switzerland    Jan. 2, 1939
201,838    Switzerland    Mar. 6, 1939